US007383893B2

(12) United States Patent
Shimma et al.

(10) Patent No.: US 7,383,893 B2
(45) Date of Patent: Jun. 10, 2008

(54) ELECTRIC HAMMER DRILL

(75) Inventors: Yasutoshi Shimma, Anjo (JP); Junichi Iwakami, Anjo (JP)

(73) Assignee: Makita Corporation, Aichi-ken (JP)

( * ) Notice: Subject to any disclaimer, the term of this patent is extended or adjusted under 35 U.S.C. 154(b) by 133 days.

(21) Appl. No.: 11/180,567

(22) Filed: Jul. 14, 2005

(65) Prior Publication Data

US 2006/0032645 A1 Feb. 16, 2006

(30) Foreign Application Priority Data

Jul. 20, 2004 (JP) ............................ 2004-212043

(51) Int. Cl.
*B23B 45/02* (2006.01)

(52) U.S. Cl. ........................ 173/48; 173/104; 173/109; 173/117

(58) Field of Classification Search .................. 173/48, 173/104, 109, 117
See application file for complete search history.

(56) References Cited

U.S. PATENT DOCUMENTS 4,763,733 A * 8/1988 Neumaier .................... 173/48
5,775,440 A * 7/1998 Shinma ...................... 173/109
5,842,527 A 12/1998 Arakawa et al.
6,015,017 A * 1/2000 Lauterwald .................. 173/48
6,176,321 B1 1/2001 Arakawa et al.
6,557,648 B2 * 5/2003 Ichijyou et al. ............... 173/48
6,619,149 B2 * 9/2003 Funfer ......................... 74/329
7,121,359 B2 * 10/2006 Frauhammer et al. ........ 173/48

* cited by examiner

*Primary Examiner*—Rinaldi I. Rada
*Assistant Examiner*—Michelle Lopez
(74) *Attorney, Agent, or Firm*—Oliff & Berridge, PLC

(57) ABSTRACT

It is an object of the present invention to provide an effective technique to alleviate vibration in the electric hammer drill. According to the invention, representative electric hammer drill is provided with a body, a motor, a striker, a cylinder, first and second power transmitting mechanisms, a power switching mechanism, a mode changing mechanism, and a coupling mechanism. The mode changing mechanism is disposed on the upper surface of the body and can change between a hammer-drill mode and a hammer mode. The coupling mechanism is disposed between the mode changing mechanism and the power switching mechanism. The coupling mechanism extends along the peripheral surface of the cylinder and transmits the mode changing movement of the mode changing mechanism to the power switching mechanism by moving in the longitudinal direction of the cylinder. Because the mode changing mechanism is disposed on the upper surface of the body and the coupling mechanism extends along the peripheral surface of the cylinder to move in the longitudinal direction of the cylinder, the center of gravity of the electric hammer drill is positioned nearer to the axis of the cylinder, compared with the known art in which the components for the switching the operation modes are centralized in one area. As a result, operating vibration of the electric hammer drill is effectively alleviated.

10 Claims, 4 Drawing Sheets

ELECTRIC HAMMER DRILL

BACKGROUND OF THE INVENTION

1. Field of the Invention

The present invention relates to an electric hammer drill that can switch operation modes to perform predetermined processing works on a work-piece.

2. Description of the Related Art

A known electric hammer drill to switch between a hammer mode and a hammer-drill mode is disclosed in Japanese non-examined laid-open Patent Publication No. 2002-192481. In the known electric hammer drill, a piston is caused to reciprocate within a cylinder via a crank mechanism driven by a motor. Then, a striker is linearly driven via air spring and the striking movement is transmitted to the tool bit via an intermediate element. Further, a rotation transmitting mechanism is provided which transmits rotation of the motor from an intermediate shaft to the tool bit via the cylinder and a tool holder. A clutch mechanism is disposed in the rotation transmitting mechanism and is adapted to transmit rotation of the motor to the tool bit by engaging clutch claws and to prevent such transmission of rotation to the tool bit by disengaging the clutch claws. Further, a mode changing mechanism is provided which serves to switch the clutch mechanism between the state of transmitting rotation and the state of preventing the transmission of rotation. When the mode changing mechanism is switched to the hammer mode, the rotation of the tool bit is prevented so that an operation solely by a striking movement of the tool bit can be performed. When the mode changing mechanism is switched to the hammer-drill mode, rotation is transmitted to the tool bit so that an operation by a combined movement of striking and rotating can be performed.

Generally, in an electric hammer drill in which the cylinder and the motor are arranged within the tool body such that the respective axes run generally crossing to each other to form "L" shape, the center of gravity of the electric hammer drill is positioned below the axis of the cylinder and slightly forward of the axis of the motor. The user performs a predetermined operation by holding a handgrip on the opposite side of the tool bit, and a side handle. The greater the distance between the center of gravity and the axis of the cylinder, the larger the vibration in the longitudinal direction (the longitudinal direction of the cylinder) or in the vertical direction. In the known electric hammer, the intermediate shaft of the rotation transmitting mechanism that transmits rotation of the motor to the cylinder (the tool bit) is placed forward of the motor and below the cylinder. The clutch mechanism that serves to releasably transmit the rotation is placed on the intermediate shaft. Further, the mode changing mechanism that serves to switch the clutch mechanism between the engaged state and the disengaged state is placed near the clutch mechanism. Thus, the components for switching the operation modes of the tool bit are centralized in one area. In such a case, the weight of the lower part below the axis of the cylinder is further increased and the balance of weight is tipped. Thus, the center of gravity of the electric hammer drill is displaced farther downward away from the axis of the cylinder. Therefore, the known electric hammer is in difficulty to decrease operating vibration.

SUMMARY OF THE INVENTION

Accordingly, it is an object of the present teachings to provide an effective technique to alleviate vibration in the electric hammer drill.

The object of the invention is achieved by an electric hammer drill with a body, a motor, a striker, a cylinder, first and second power transmitting mechanisms, a power switching mechanism, a mode changing mechanism, and a coupling mechanism. The motor is housed within the body. The tool bit is disposed in a tip end region of the body. The striker linearly moves in the axial direction of the tool bit and causes the tool bit to perform a striking movement. The striker is slidably disposed in the cylinder. The first power transmitting mechanism causes the striker to move linearly by a rotating output of the motor, while the second power transmitting mechanism includes a region of transmitting rotation by engagement between a driving gear and a driven gear and causes the tool bit to rotate around its axis by a rotating output of the motor. The power switching mechanism can switch between a state of transmitting rotation of the motor to the hammer bit and a state of preventing the transmission of rotation, while keeping the driving gear and the driven gear of the second power transmitting mechanism in engagement with each other.

The mode changing mechanism is disposed on the upper surface of the body and can change between a hammer-drill mode in which the tool bit is caused to perform a combined movement of striking and rotating and a hammer mode in which the tool bit is caused to perform only a striking movement. The coupling mechanism is disposed between the mode changing mechanism and the power switching mechanism and is adapted to cause the power switching mechanism to switch to the state of power transmission when the mode changing mechanism is switched to the hammer drill mode, while causing the power switching mechanism to switch to the state of preventing the power transmission when the mode changing mechanism is switched to the hammer mode. The coupling mechanism extends along the peripheral surface of the cylinder and transmits the mode changing movement of the mode changing mechanism to the power switching mechanism by moving in the longitudinal direction of the cylinder.

According to the invention, because the mode changing mechanism is disposed on the upper surface of the body and the coupling mechanism extends along the peripheral surface of the cylinder to move in the longitudinal direction of the cylinder, the center of gravity of the electric hammer drill is positioned nearer to the axis of the cylinder, compared with the known art in which the components for switching the operation modes are centralized in one area. As a result, operating vibration of the electric hammer drill is effectively alleviated.

Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved electric hammer drills and method for using such electric hammer drills and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
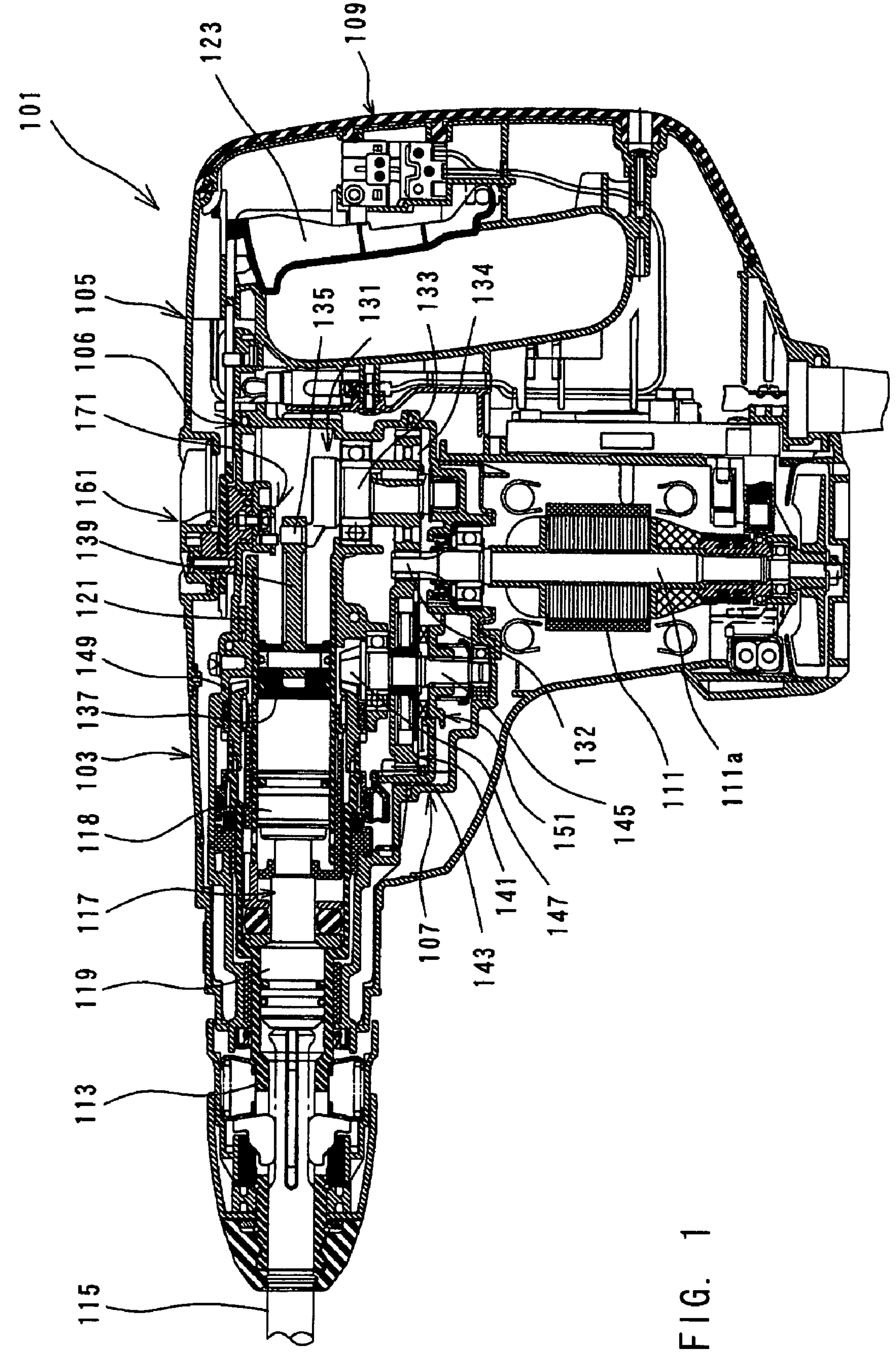
FIG. 1 is a sectional view schematically showing an entire electric hammer drill according to an embodiment of the invention.
Figure 2:
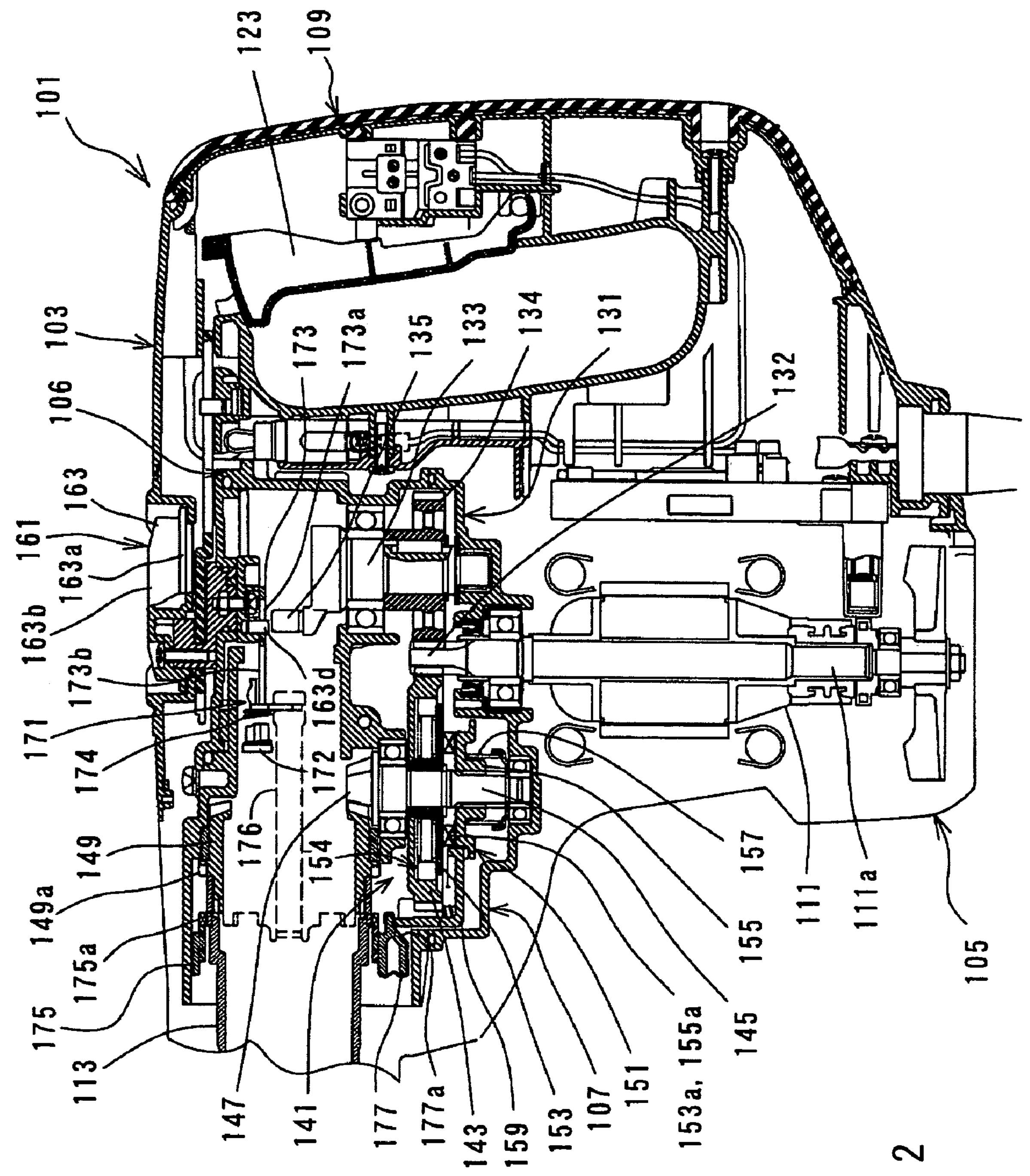
FIG. 2 is a sectional view of an essential part of the representative electric hammer drill, including a clutch operating mechanism, with clutches in engagement with each other.
Figure 3:
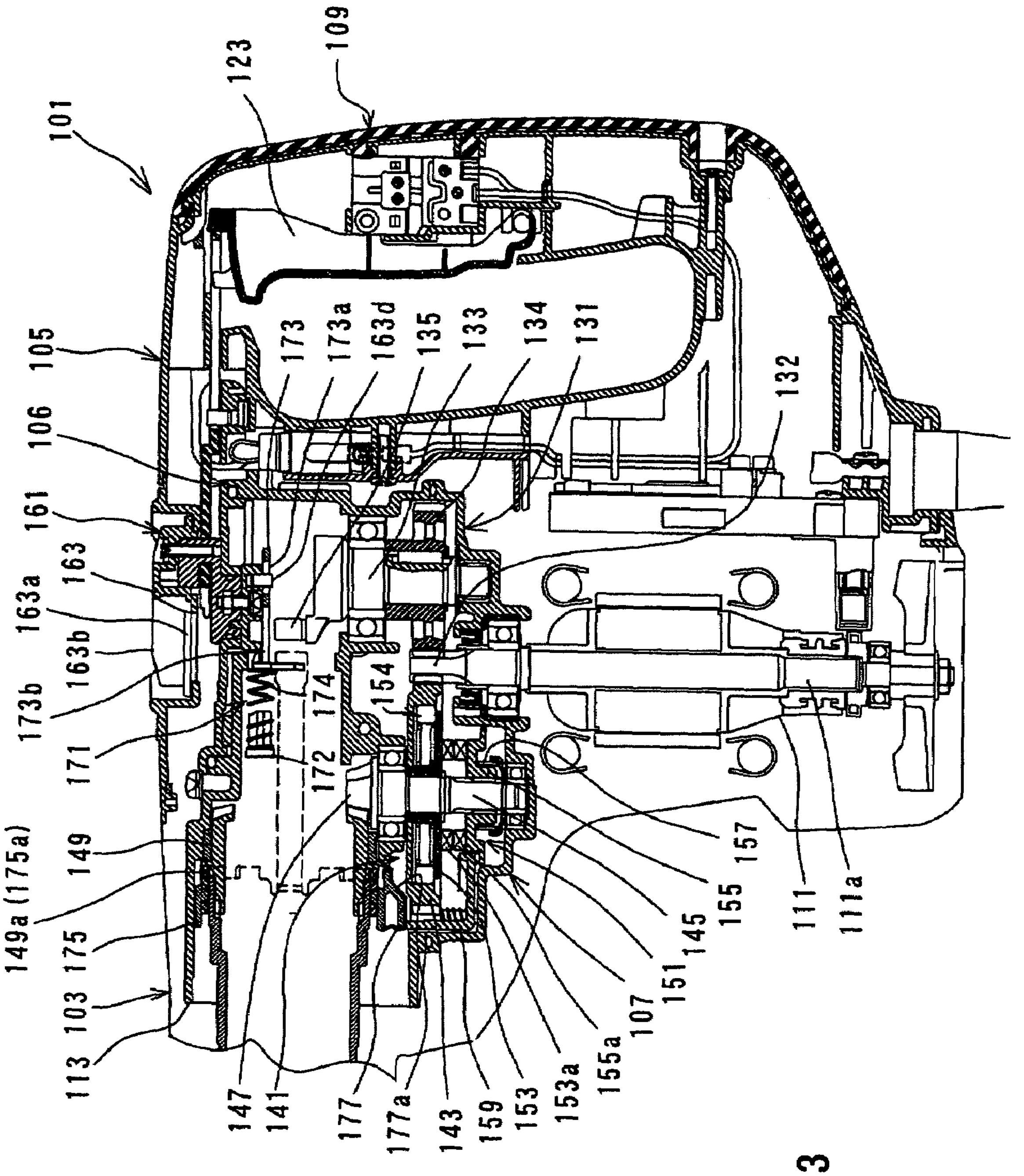
FIG. 3 is a sectional view of an essential part of the representative electric hammer drill including a clutch operating mechanism, with clutches in disengagement from each other.
Figure 4:
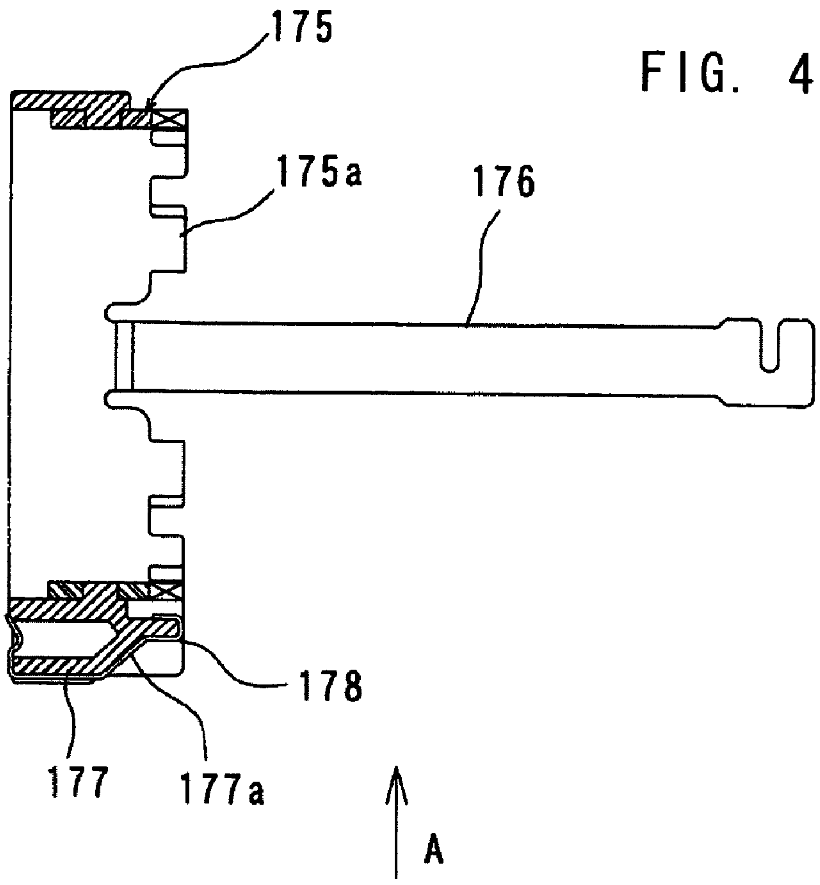
FIG. 4 is a sectional view showing a ring of the clutch operating mechanism.

A representative embodiment of the present invention will now be described with reference to FIGS. 1 to 4. FIG. 1 shows an entire electric hammer drill 101 according to the embodiment of the present invention. FIGS. 2 and 3 show the essential part of the hammer drill 101. FIG. 4 shows a ring of a coupling mechanism that actuates a clutch mechanism according to mode changing operation. As shown in FIG. 1, the hammer drill 101 of the embodiment includes a body 103, a tool holder 113 connected to the tip end region of the body 103, and a hammer bit 115 detachably coupled to the tool holder 113. The hammer bit 115 is held in the tool holder 113 such that it is allowed to slide with respect to the tool holder 113 in its longitudinal direction and prevented from rotating with respect to the tool holder 113 in its circumferential direction. The hammer bit 115 is a feature that corresponds to the "tool bit" according to the present invention.

The body 103 includes a motor housing 105 that houses a driving motor 111, a crank housing 106 that houses a motion converting mechanism 131 and a striking mechanism 117, a gear housing 107 that houses a power transmitting mechanism 141, and a handgrip 109. The motion converting mechanism 131 is a feature that corresponds to the "first power transmitting mechanism" according to the invention. The driving motor 111 is mounted such that a rotating shaft 111*a* of the driving motor runs substantially perpendicularly to the longitudinal direction of the body 103 (vertically as viewed in FIG. 1). The motion converting mechanism 131 is adapted to convert the rotating output of the driving motor 111 to linear motion and then to transmit it to the striking mechanism 117. As a result, an impact force is generated in the axial direction of the hammer bit 115 via the striking mechanism 117. The motion converting mechanism 131 includes a crank mechanism driven by the driving motor 111 via a plurality of gears 132, 134. The crank mechanism includes a crank shaft 133, a crank pin 135 mounted on the crank shaft 133, a piston 137, and a connecting rod 139 that connects the piston 137 and the crank pin 135. The piston 137 is adapted to drive the striking mechanism 117 and can slide within a cylinder 121 in the axial direction of the hammer bit 115. The motor 111 and the cylinder 121 are arranged such that their axes run generally perpendicularly to each other.

The striking mechanism 117 includes a striker 118 and an intermediate element in the form of an impact bolt 119. The striker 118 is slidably disposed within the bore of the cylinder 121 together with the piston 137. The impact bolt 119 is slidably disposed within the tool holder 113 and serves to transmit the kinetic energy of the striker 118 to the hammer bit 115.

The tool holder 113 is disposed coaxially with the cylinder 121 and can rotate. The tool holder 113 is rotated by the driving motor 111 via the power transmitting mechanism 141 having a gear train. The power transmitting mechanism 141 is a feature that corresponds to the "second power transmitting mechanism" according to the invention. A clutch mechanism 151 is disposed in the power transmitting mechanism 141 and is adapted to enable or disable the power transmitting mechanism 141 to transmit rotation of the motor 111 to the tool holder 113 via the clutch mechanism 151. The clutch mechanism 151 is a feature that corresponds to the "power switching mechanism" according to the invention.

As shown in FIGS. 2 and 3, the power transmitting mechanism 141 includes an intermediate gear 143 driven by the motor 111, an intermediate shaft 145, a first bevel gear 147 and a second bevel gear 149. Rotation of the intermediate gear 143 is transmitted to the intermediate shaft 145 via the clutch mechanism 151. Rotation of the intermediate shaft 145 is in turn transmitted to the tool holder 113 via the first bevel gear 147 and the second bevel gear 149 that engages with the first bevel gear 147. The first bevel gear 147 is integrally formed on the axial end of the intermediate shaft 145. The second bevel gear 149 is disposed coaxially with the cylinder 121 and rotates together with the tool holder 113. The intermediate shaft 145 is arranged parallel to the rotating shaft 11*a* of the motor 111 and perpendicularly to the axis of the cylinder 121. The first bevel gear 147 and the second bevel gear 149 are features that correspond to the "driving gear" and the "driven gear", respectively, according to the invention.

The clutch mechanism 151 includes engaging clutches, i.e. a driving clutch 153 and a driven clutch 155. The driving clutch 153 is loosely fitted on the intermediate shaft 145. The driven clutch 155 is fitted on the intermediate shaft 145 by spline engagement such that the driven clutch 155 can slide with respect to the intermediate shaft 145 in its axial direction and rotate together with the intermediate shaft 145 in its circumferential direction. The driving clutch 153 is coupled to the intermediate gear 143 rotated by the driving motor 111, via a torque limiter 154. When the driving motor 111 is driven, the driving clutch 153 rotates together with the intermediate gear 143 as long as the torque on the hammer bit 115 is below a threshold value set by the torque limiter 154. The driving clutch 153 and the driven clutch 155 face with each other in the axial direction of the intermediate shaft 145 and have respective claws 153*a*, 155*a* on the opposed surfaces. The driven clutch 155 is urged toward the driving clutch 153 by the biasing force of a biasing member in the form of a clutch spring 157. The driven clutch 155 transmits the rotation to the intermediate shaft 145 when the claws 155*a* of the driven clutch 155 engage with the claws 153*a* of the driving clutch 153. When the driven clutch 155 is separated from the driving clutch 153 against the biasing force of the clutch spring 157, the claws 155*a* and 153*a* are disengaged from each other and thus the driven clutch 155 is prevented from transmitting the rotation. Switching control of the clutch mechanism 151 will be explained below.

The hammer drill 101 includes a mode changing mechanism 161. The mode changing mechanism 161 can change between a hammer-drill mode and a hammer mode. In the hammer drill mode, the hammer bit 115 is caused to perform a combined movement of striking and rotating. In the hammer mode, the hammer bit 115 is caused to perform a striking movement.

As shown in FIGS. 2 and 3, the mode changing mechanism 161 includes a mode-changing operating member 163. Engagement of the clutch mechanism 151 is controlled via a clutch operating mechanism 171 according to the switching operation of the mode-changing operating member 163. The clutch operating mechanism 171 is a feature that corresponds to the "coupling mechanism" according to the present invention. The mode-changing operating member 163 is mounted externally on the upper surface of the motor housing 105 such that it can be operated by the user. Specifically, the mode-changing operating member 163 is disposed on the side opposite to the clutch mechanism 151 with respect to the cylinder 121. The mode-changing operating member 163 includes a disc 163*a* with an operating grip 163*b* and is mounted on the motor housing 105 such that it can be turned in a horizontal plane. Although not shown, the operating grip 163*b* is mounted on the upper surface of the disc 163*a* and extends in the diametrical direction of the disc. One end of the operating grip 163*b* in the diametrical direction is tapered and forms a switching position pointer. The two mode positions, i.e. hammer drill mode position and hammer mode position, are marked on the motor housing 105 in predetermined intervals in the circumferential direction of the disc 163*a*. Further, an eccentric pin is mounted on the underside of the disc 163*a* of the mode-changing operating member 163 in a position displaced from the center of rotation of the disc 163*a*.

When the mode-changing operating member 163 is operated to switch between the modes, the clutch operating mechanism 171 transmits the switching movement to the clutch mechanism 151. As shown in FIGS. 2 and 3, the clutch operating mechanism 171 includes a frame member 173 that is generally U-shaped in plan view, a ring 175 (see FIGS. 4 and 5) and a wedge-shaped cam 177. The frame member 173 is caused to move lineally in the longitudinal direction of the cylinder 121 (the axial direction of the hammer bit 115) by revolving movement of the eccentric pin 163*d* when the mode-changing operating member 163 is turned in a horizontal plane. The ring 175 is coupled to the frame member 173. The cam 177 is mounted on the ring 175 and adapted to control the engagement of the clutch mechanism 151. The frame member 173 is disposed generally horizontally within the gear housing 107. The ring 175 is a feature that corresponds to the "cylindrical element" according to the invention. The frame member 173 is generally U-shaped in plan view. The frame member 173 is disposed generally horizontally in a crank room within the crank housing 106 and coupled to the mode-changing operating member 163 on the base side. Specifically, the frame member 173 is generally U-shaped having a base and two legs 173*b*. A slot 173*a* (shown in FIGS. 1 to 3 in sectional view) is formed in the base of the frame member 173 and engages with the eccentric pin 163*d*. The legs 173*b* extend toward the ring 175 through a space around the cylinder 121. The frame member 173 is linearly moved in the longitudinal direction of the cylinder 121 by revolving movement of the eccentric pin 163*d*. A guide 172 (partly shown in FIGS. 1 to 3) guides the frame member 173 to move linearly.

The ring 175 is disposed around the outside of the cylinder 121 and can slide in the longitudinal direction of the tool holder 113. The ring 175 has two leg pieces 176 (see FIG. 5) that extend from one axial end of the ring 175 toward the frame member 173. The ends of the leg pieces 176 are coupled to the legs 173*b* of the frame member 173. Thus, the frame member 173 and the ring 175 move together horizontally in the longitudinal direction of the cylinder 121. The frame member 173 and the leg pieces 176 form the "relay members" according to the invention. The cam 177 is mounted on the lower surface of the ring 175 and moves together with the ring 175. The cam 177 lies apart from a clutch control member 159 of the clutch mechanism 151 when the mode-changing operating member 163 is in the hammer drill mode position (see FIG. 2). In this state, the claws 155*a* of the driven clutch 155 are in engagement with the claws 153*a* of the driving clutch 153. When the mode-changing operating member 163 is turned to the hammer mode position, a slanted surface 177*a* of the cam 177 presses on the clutch control member 159 (see FIG. 3). As a result, the clutch control member 159 pushes the driven clutch 155 away from the driving clutch 153 against the biasing force of the clutch spring 157, so that the claws 153*a* and 155*a* are disengaged from each other. The cam surface (contact surface that contacts the clutch control member 159) of the cam 177 is covered with an iron (steel) plate 178 for reinforcement, which ensures smooth sliding movement and increase of durability of the cam.

Figure 5:
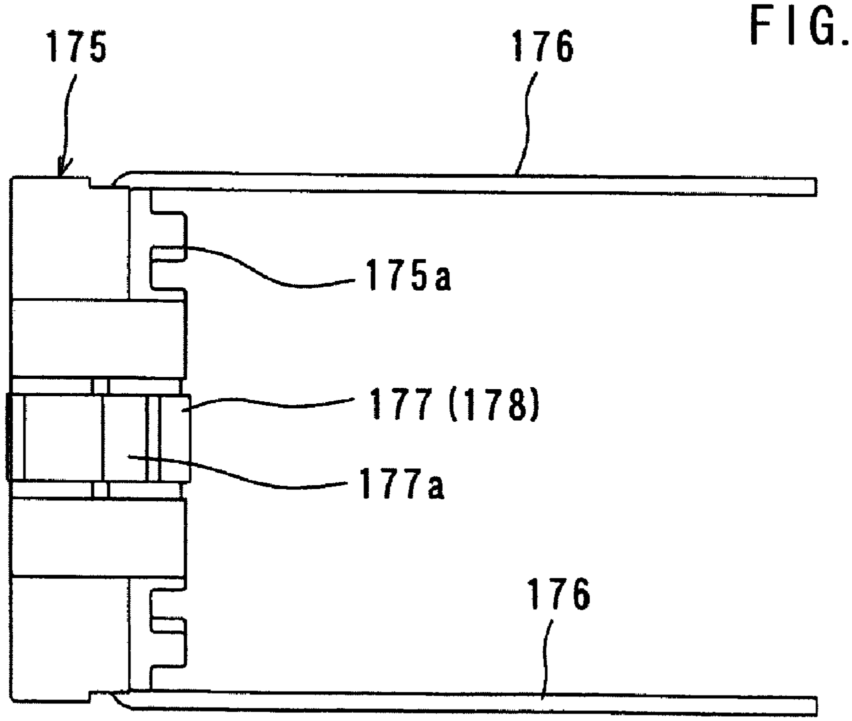
FIG. 5 is an illustration when viewed from the direction shown by arrow A in FIG. 4.

As shown in FIGS. 4 and 5, claws 175*a* are formed on the entire circumference of one axial end of the ring 175. When the mode-changing operating member 163 is turned to the hammer mode position, the claws 175*a* respectively engage with claws 149*a* (see FIGS. 1 to 3) formed on one axial end of the second bevel gear 149, so that free rotation of the second bevel gear 149 is prevented. Thus, when the hammer bit 115 is driven in the hammer mode, free rotation of the tool holder 113 and the hammer bit 115 is prevented. In order to achieve smooth engagement between the claws 175*a* and 149*a* for this purpose, the frame member 173 is urged in the direction that causes engagement between the claws 175*a* and 149*a*, by a spring 174 disposed between the frame member 173 and the guide 172. Further, a predetermined play is provided between the slot 173*a* and the eccentric pin 163*d* in the moving direction of the frame member 173.

Operation and usage of the hammer drill 101 constructed as described above will now be explained.

As shown in FIG. 2, when the user turns the mode-changing operating member 163 to the hammer drill mode position, the frame member 173 is caused to move via the eccentric pin 163*d* toward the tip end (the hammer bit 115) of the hammer drill 101. Thus, the ring 175 and the cam 177 also move in this direction and the cam 177 moves away from the clutch control member 159. As a result, the engagement between the claws 155*a* of the driven clutch 155 and the claws 153*a* of the driving clutch 153 is maintained by the biasing force of the clutch spring 157.

In this state, when the trigger 123 on the handgrip 109 is depressed to drive the driving motor 111, the rotation of the driving motor 111 is converted into linear motion via the motion converting mechanism 131. The piston 137 of the motion converting mechanism 131 then reciprocates within the bore of the cylinder 121. The linear motion of the piston 137 causes the striker 118 of the striking mechanism 117 to move via air spring. The linear motion is further transmitted to the hammer bit 111 via the impact bolt 119. Further, the rotation of the driving motor 111 is transmitted as rotation to the tool holder 113 that can freely rotates on the same axis as the cylinder 121 and the hammer bit 111 (supported by the tool holder 113 such that the hammer bit 111 is prevented from rotating with respect to the tool holder 113) via the power transmitting mechanism 141. Specifically, the hammer bit 115 is driven with the combined movement of striking (hammering) and rotating (drilling) in the hammer drill mode. Thus, a predetermined hammer-drill operation is performed on the workpiece.

When the user turns the mode-changing operating member 163 from the hammer drill mode position to the hammer mode position, the frame member 173 of the clutch operating mechanism 171 is caused to move via the eccentric pin **163*d* toward the rear (the handgrip 109) of the hammer drill 101. Thus, the ring 175 and the cam 177 also move in this direction and the slanted surface 177*a* of the cam 177 presses on the clutch control member 159 by components of movement in a direction perpendicular to the moving direction of the cam 177. As a result, the clutch control member 159 moves in the axial direction of the intermediate shaft 145 and pushes the driven clutch 155 away from the driving clutch 153 against the biasing force of the clutch spring 157, so that the claws 153*a* and 155*a* are disengaged from each other. Therefore, the hammer bit 115 does not rotate in the hammer mode (see FIG. 3**).

In this state, when the trigger 123 is depressed to drive the driving motor 111, the rotation of the driving motor 111 is converted into linear motion via the motion converting mechanism 131. Then, the linear motion is transmitted to the hammer bit 111 via the striker 118 of the striking mechanism 117 and the impact bolt 119. At this time, the clutch mechanism 151 of the power transmitting mechanism 141 is in the disengaged state, so that rotation is not transmitted to the hammer bit 115. Therefore, in the hammer mode, the user can perform a predetermined hammering operation solely by the striking movement (hammering) of the hammer bit 115.

In the electric hammer drill 101 of this embodiment, the driving motor 111 is arranged such that its axis is perpendicular to the axis of the cylinder 121. The center of gravity of the electric hammer drill 101 of this type is typically positioned below the axis of the cylinder 121 and slightly forward of the axis of the driving motor 111. It is known that the greater the distance between the center of gravity and the axis of the cylinder 121, the larger the vibration in the longitudinal direction (the longitudinal direction of the cylinder 121) or in the vertical direction as viewed in FIG. 1 (the direction of the axis of the driving motor 111).

In this respect, according to the embodiment, the mode changing mechanism 161 operated by the user is disposed on the upper surface of the body 103 above the cylinder 121, while the clutch mechanism 151 is disposed below the cylinder 121 on the intermediate shaft 145 of the power transmitting mechanism 141. The switching movement of the mode-changing operating member 163 is transmitted to the clutch mechanism 151 via the clutch operating mechanism 171. Specifically, components for switching the operation modes of the hammer bit 115 are arranged in a decentralized manner above and below the axis of the cylinder 121. Thus, the center of gravity of the electric hammer drill 101 is positioned nearer to the axis of the cylinder 121, compared with the known art in which the components for the switching the operation modes are centralized in one area. As a result, vibration which may be caused in the longitudinal direction or in the vertical direction during operation can be effectively alleviated or reduced.

Further, with the construction in which the mode changing mechanism 161 is disposed on the upper surface of the body 103, the user can easily operate the mode changing mechanism 161 with one hand, left or right, while holding the handgrip 109 with the other hand. Specifically, compared with the known art construction in which the mode changing mechanism 161 is disposed on the side surface of the body 103, the user, whether right-handed or left-handed, can more easily operate the mode changing mechanism 161, so that the ease of use is enhanced.

In order to have the center of gravity in a position nearer to the axis of the cylinder 121, it is more advantageous to dispose the clutch mechanism 151 coaxially with the cylinder 121. However, in such a case, the clutch mechanism 151 is disposed around the outer periphery of the cylinder 121, which disadvantageously results in increase of the size in the radial direction and thus in increase of the weight. According to this embodiment, the clutch mechanism 151 is disposed coaxially with the intermediate shaft 145 of the power transmitting mechanism 141. Therefore, the clutch mechanism 151 can be made smaller and takes up less space. Thus, advantageously, the entire electric hammer drill 101 can be made compact.

Further, in the clutch operating mechanism 171 of this embodiment, the ring 175 is disposed around the cylinder 121 and has the two leg pieces 176 that are diametrically opposed to each other with respect to the axis of the cylinder 121 and extend in the direction of the axis. The leg pieces 176 are coupled to the generally U-shaped frame member 173. With this construction, when the mode-changing operating member 163 is operated to switch between the modes, the switching movement is transmitted to the ring 175 via the two leg pieces 176 diametrically opposed to each other with respect to the axis of the cylinder 121. Therefore, the ring 175 is moved with stability while keeping its balance. Thus, the switching movement of the clutch mechanism 151 is reliably performed.

Further, according to the embodiment, the driving motor 11 has been described as being arranged such that its axis is perpendicular to the axis of the cylinder 121. However, the present invention may be applied to an electric hammer drill in which the axis of the driving motor 111 is parallel to the axis of the cylinder 121. In this case, a swash plate mechanism is used as the motion converting mechanism that converts the rotating output of the driving motor 111 to linear motion. In such a hammer drill that utilizes the swash plate mechanism, the axis of rotation of the power transmitting mechanism 141 that transmits rotation of the driving motor 111 to the hammer bit 115, or the axis of the intermediate shaft 145, is parallel to the axis of the cylinder 121 and the axis of the driving motor 111. In this case, too, the clutch mechanism 151 is disposed on the intermediate shaft 145 and can be configured to switch between the state of transmitting rotation of the motor 111 to the hammer bit 115 and the state of preventing the transmission of rotation while keeping the gears of the power transmitting mechanism 141 in engagement with each other, when the mode-changing operating member 163 is operated.

Further, according to the embodiment, the operation modes of the hammer bit 115 have been described as being switched between the hammer drill mode and the hammer mode. The operation modes may not be limited to these modes. For example, the present invention may be constructed so as to allow the setting of a drill mode in which the hammer bit 115 only performs rotation or a neutral mode in which the hammer bit 115 does not perform rotation nor striking movement. Further, the clutch operating mechanism 171 that engages or disengages the claws **153*a* and 155*a* of the clutch mechanism 151 according to the switching operation of the mode-changing operating member 163**, is not limited to the construction as shown in the drawings, but may be changed to a link mechanism.

DESCRIPTION OF NUMERALS

101 electric hammer drill
103 body
105 motor housing
106 crank housing
107 gear housing
109 handgrip
111 driving motor (motor)
111*a* rotating shaft
113 tool holder
115 hammer bit (tool bit)
117 striking mechanism
118 striker
119 impact bolt (intermediate element)
121 cylinder
123 trigger
131 motion converting mechanism (first power transmitting mechanism)
132 gear
133 crank shaft
134 gear
135 crank pin
137 piston
139 connecting rod
141 power transmitting mechanism (second power transmitting mechanism)
143 intermediate gear
145 intermediate shaft
147 first bevel gear
149 second bevel gear
149*a* claw
151 clutch mechanism (power switching mechanism)
153 driving clutch
153*a* claw
154 torque limiter
155 driven clutch
155*a* claw
157 clutch spring
159 clutch control member
161 mode-changing mechanism
163 mode-changing operating member
163*a* disc
163*b* operating grip
163*d* eccentric pin
171 clutch operating mechanism (coupling mechanism)
172 guide
173 frame member (relay member)
173*a* slot
173*b* leg
174 spring
175 ring
175*a* claw
176 leg piece (relay member)
177 cam
177*a* slanted surface

We claim:

1. An electric hammer drill comprising:
a body,
a motor housed within the body,
a tool holder that holds a tool bit disposed in a tip end region of the body,
a striker that linearly moves in the axial direction of the tool bit and causes the tool bit to perform a striking movement,
a cylinder in which the striker is slidably disposed,
a first power transmitting mechanism that causes the striker to move linearly by a rotating output of the motor,
a second power transmitting mechanism that includes a region of transmitting rotation by engagement between a driving gear and a driven gear and causes the tool bit to rotate around its axis by a rotating output of the motor,
a power switching mechanism that can switch between a state of transmitting rotation of the motor to the hammer bit and a state of preventing the transmission of rotation while keeping the driving gear and the driven gear of the second power transmitting mechanism in engagement with each other,
a mode changing mechanism disposed on the upper surface of the body and can change between a hammer-drill mode in which the tool bit is caused to perform a combined movement of striking and rotating and a hammer mode in which the tool bit is caused to perform only a striking movement, and
a coupling mechanism disposed between the mode changing mechanism and the power switching mechanism and is adapted to cause the power switching mechanism to switch to the state of power transmission when the mode changing mechanism is switched to the hammer drill mode, while causing the power switching mechanism to switch to the state of preventing the power transmission when the mode changing mechanism is switched to the hammer mode,
wherein the coupling mechanism extends along the peripheral surface of the cylinder and transmits the mode changing movement of the mode changing mechanism to the power switching mechanism by moving in the longitudinal direction of the cylinder, and
wherein the coupling mechanism includes a cylindrical element that is disposed around the cylinder and that can move in the longitudinal direction of the cylinder, the coupling mechanism being adapted to transmit the mode changing movement of the mode changing mechanism in the longitudinal direction of the cylinder to the cylindrical element via a plurality of relay members disposed on opposite sides of the cylinder, and wherein the cylindrical element includes a cam that causes the power switching mechanism to switch to the state of power transmission or to the state of preventing the power transmission, by components of movement in a direction perpendicular to the longitudinal direction of the cylinder, when the cam moves together with the cylindrical element in the longitudinal direction of the cylinder.

2. The hammer drill as defined in claim 1, wherein the cylindrical element prevents free rotation of the tool bit by an engagement with a member that rotates together with the tool bit when the mode changing mechanism is switched to the hammer mode.

3. The hammer drill as defined in claim 1, wherein the cylindrical element is disposed coaxially with the cylinder and the relay members on the opposite sides of the cylinder are connected to the cylindrical element on a straight line that extends in the radial direction passing across the axis of the cylinder.

4. The hammer drill as defined in claim 1, wherein the body further includes a handgrip disposed on the opposite side of the tool bit, and wherein the mode changing mechanism is disposed on the upper surface of the body and forward of the handgrip.

5. The hammer drill as defined in claim 1, wherein the power switching mechanism is disposed on the side opposite to the mode changing mechanism with respect to the cylinder.

6. The hammer drill as defined in claim 1, wherein the power switching mechanism includes engaging clutches.

7. The hammer drill as defined in claim 1, wherein the axis of the motor is perpendicular or parallel to the axis of the cylinder.

8. The hammer drill as defined in claim 1, wherein the second power transmitting mechanism includes an intermediate shaft that transmits rotation of the motor to the tool holder, and wherein the power switching mechanism is disposed in the second power transmitting mechanism.

9. The hammer drill as defined in claim 8, wherein the driving gear is integrally formed on an end of the intermediate shaft.

10. An electric hammer drill comprising:

a body, a motor that is housed within the body, a tool holder that holds a tool bit disposed in a tip end region of the body, a striker that linearly moves in the axial direction of the tool bit and causes the tool bit to perform a striking movement, a cylinder in which the striker is slidably disposed, a first power transmitting mechanism that causes the striker to move linearly by a rotating output of the motor, a second power transmitting mechanism that includes a region of transmitting rotation by engagement between a driving gear and a driven gear and causes the tool bit to rotate around its axis by a rotating output of the motor, a power switching mechanism that can switch between a state of transmitting rotation of the motor to the hammer bit and a state of preventing the transmission of rotation while keeping the driving gear and the driven gear of the second power transmitting mechanism in engagement with each other, a mode changing mechanism that is disposed on the upper surface of the body and is adapted to change between a hammer-drill mode in which the tool bit is caused to perform a combined movement of striking and rotating and a hammer mode in which the tool bit is caused to perform only a striking movement, and a coupling mechanism that is disposed between the mode changing mechanism and the power switching mechanism and is adapted to cause the power switching mechanism to switch to the state of power transmission when the mode changing mechanism is switched to the hammer drill mode, while causing the power switching mechanism to switch to the state of preventing the power transmission when the mode changing mechanism is switched to the hammer mode, wherein the coupling mechanism includes a cylindrical element that is disposed around the cylinder and that can move in the longitudinal direction of the cylinder and wherein the coupling mechanism transmits the mode changing movement of the mode changing mechanism in the longitudinal direction of the cylinder to the cylindrical element via a plurality of relay members that are disposed on the-opposite sides of the cylinder, and wherein the cylindrical element includes a cam that causes the power switching mechanism to switch to the state of power transmission or to the state of preventing the power transmission, by components of movement in a direction perpendicular to the longitudinal direction of the cylinder, when the cam moves together with the cylindrical element in the longitudinal direction of the cylinder.

* * * * *